United States Patent
Jelinek et al.

(10) Patent No.: US 8,954,686 B2
(45) Date of Patent: Feb. 10, 2015

(54) PHYSICAL MEMORY CAPPING FOR USE IN VIRTUALIZATION

(75) Inventors: Gerald A. Jelinek, Colorado Springs, CO (US); Daniel B. Price, Menlo Park, CA (US); David S. Comay, San Ramon, CA (US); Stephen Frances Lawrence, Newark, CA (US)

(73) Assignee: Oracle America, Inc., Redwood City, CA (US)

( * ) Notice: Subject to any disclaimer, the term of this patent is extended or adjusted under 35 U.S.C. 154(b) by 349 days.

(21) Appl. No.: 11/765,133

(22) Filed: Jun. 19, 2007

(65) Prior Publication Data

US 2008/0320242 A1    Dec. 25, 2008

(51) Int. Cl.
*G06F 12/00* (2006.01)
*G06F 9/50* (2006.01)
*G06F 12/10* (2006.01)

(52) U.S. Cl.
CPC ............ *G06F 9/5077* (2013.01); *G06F 12/109* (2013.01); *Y02B 60/142* (2013.01); *G06F 2209/504* (2013.01)
USPC ..................... 711/153; 711/173; 711/E12.006

(58) Field of Classification Search
USPC ........ 711/100, 118, 203; 702/188; 718/1, 104
See application file for complete search history.

(56) References Cited

U.S. PATENT DOCUMENTS

| | | | |
|---|---|---|---|
| 7,206,890 B2 * | 4/2007 | Mathiske | 711/6 |
| 7,433,951 B1 * | 10/2008 | Waldspurger | 709/226 |
| 8,346,822 B2 * | 1/2013 | Phillips et al. | 707/814 |
| 8,793,427 B2 * | 7/2014 | Lim et al. | 711/6 |
| 2002/0199061 A1 * | 12/2002 | Friedman et al. | 711/118 |
| 2003/0036886 A1 * | 2/2003 | Stone | 702/188 |
| 2004/0117540 A1 * | 6/2004 | Hahn et al. | 711/100 |
| 2005/0262324 A1 * | 11/2005 | Mathiske | 711/170 |
| 2009/0083749 A1 * | 3/2009 | Creamer et al. | 718/104 |
| 2009/0132769 A1 * | 5/2009 | Pronovost et al. | 711/145 |
| 2009/0144349 A1 * | 6/2009 | Phillips et al. | 707/206 |
| 2011/0153689 A1 * | 6/2011 | Hall et al. | 707/813 |

OTHER PUBLICATIONS

Webopedia, virtual machine, Apr. 25, 2007, http://webopedia.com/TERM/v/virtual_machine.html.*
http://en.wikipedia.org/wiki/Solaris_Containers.*
http://en.wikipedia.org/wiki/Virtual_Machines.*
MIT, 2006, http://stuff.mit.edu/afs/sipb/project/vmdialup/lib/vmware-console/help/server/memory.htm, pp. 1-3.*

(Continued)

*Primary Examiner* — Sean D Rossiter
(74) *Attorney, Agent, or Firm* — Brooks Kushman P.C.

(57) ABSTRACT

A method of implementing virtualization involves an improved approach to resource management. A virtualizing subsystem is capable of creating separate environments that logically isolate applications from each other. Some of the separate environments share physical resources including physical memory. When a separate environment is configured, properties for the separate environment are defined. Configuring a separate environment may include specifying a physical memory usage cap for the separate environment. A global resource capping background service enforces physical memory caps on any separate environments that have specified physical memory caps.

13 Claims, 6 Drawing Sheets

(56) References Cited

OTHER PUBLICATIONS

Joost Pronk van Hoogeveen and Paul Steeves, Solaris Software, "Solaris 10 How to Guides: Consolidating Servers and Applications with Solaris Containers," 2005, Sun Microsystems, Inc., Santa Clara, California.

"System Administration Guide: Solaris Containers-Resource Management and Solaris Zones," Part No. 817-1592, 2006, Sun Microsystems, Inc., Santa Clara, California.

* cited by examiner

PHYSICAL MEMORY CAPPING FOR USE IN VIRTUALIZATION

BACKGROUND OF THE INVENTION

1. Field of the Invention

The invention relates to virtualization techniques and to resource management.

2. Background Art

A server computer, workstation, desktop computer, or any other computing platform has a plurality of physical resources that are used to provide services. These physical resource may include, for example, processors, memory, and other hardware resources. The computing platform uses the available physical resources to handle a plurality of workloads. In general, a workload is a set of related processes. Resource management is the controlling of resources and the allocation of resources among workloads on the computing platform.

One existing approach to resource management is implemented in the SOLARIS operating system from Sun Microsystems, Inc., Santa Clara, Calif. One way that the SOLARIS operating system manages resources is by using the concepts of projects, tasks, and resource controls.

The project and task entities are used to describe workloads. A task is a group of processes. A task is associated with a project. A project may include multiple tasks. The system maintains a project database. The project database maintains information about the projects on the system. Among other information, the entry for a particular project in the project database may include one or more project attributes. Project attributes may be used to set values for resource controls.

The SOLARIS operating system implements a resource control framework to implement resource controls. The resource control framework manages resource controls on processes, tasks, and projects. These resource controls are enforced by the kernel. Further, the resource control framework leverages the project database such that resource controls for a process, task, or project may be set in the project database. The existing implementation of the resource control framework may be leveraged by various SOLARIS operating system facilities. In general, the SOLARIS operating system resource control framework provides advanced, kernel-enforced resource control capabilities in a known fashion.

The SOLARIS operating system also provides a resource capping daemon that enables regulation of physical memory consumption by processes running in projects that have resource caps defined. In more detail, a resource cap is an upper bound placed on the consumption of a resource, such as physical memory. The existing resource capping daemon and associated utilities support per-project physical memory caps. Resource caps can be defined using attributes of project entries in the project database. Resource caps are asynchronously enforced at the user level by the resource capping daemon. The resource capping daemon periodically samples the resource utilization of projects that have physical memory caps. When the system's physical memory utilization exceeds the threshold for cap enforcement, and other conditions are met, the daemon takes action to reduce the resource consumption of projects with memory caps to levels at or below the caps. The resource capping daemon manages physical memory by regulating the size of a project workload's resident set (memory pages resident in physical memory) relative to the size of the project workload's working set (memory pages that the workload actively uses during its processing cycle).

Further, the resource capping daemon also supports various configuration options including the ability to configure the threshold for cap enforcement. The threshold for cap enforcement is the percentage of physical memory utilization on the system that triggers cap enforcement. The resource capping daemon periodically performs various operations. The intervals for these operations may be configured. For example, the resource capping daemon periodically samples the resident set size of projects that have physical memory caps (that are defined using attributes in the project database). This sampling interval is a configurable value. The resource capping daemon and associated utilities also support the monitoring of the resource utilization of capped projects.

Another way that the SOLARIS operating system manages resources is with SOLARIS Containers, which is an operating system virtualization technique. The use of virtualization is increasing. In general, virtualization relates to creating an abstraction layer between software applications and physical resources. There are many approaches to virtualization.

SOLARIS Containers includes several different technologies that are used together to consolidate servers and applications. With server virtualization, applications can be consolidated onto a fewer number of servers. For example, multiple virtual servers may exist on a single physical server.

The SOLARIS Containers approach to implementing virtualization involves a technology referred to as SOLARIS zones and a technology referred to as SOLARIS resource pools. Zones are separate environments on a machine that logically isolate applications from each other. Each application receives a dedicated namespace. Put another way, a zone is a type of sandbox. A resource pool is a set of physical resources such as, for example, processors. The SOLARIS pools facility is used to partition the system resources into a plurality of resource pools for the purposes of resource management. The SOLARIS zones facility is for virtualizing the operating system to improve security, provide isolation and administrative delegation.

When consolidating applications with SOLARIS Containers, physical resources are partitioned into a number of resource pools. A zone may be created for each application, and then one or more zones are assigned to each resource pool.

Another technology involved in SOLARIS Containers is called the Fair Share Scheduler (FSS). The Fair Share Scheduler is used when multiple zones are assigned to the same resource pool. The scheduler software enables resources in a resource pool to be allocated proportionally to applications, that is, to the zones that share the same resource pool.

In an existing implementation of SOLARIS Containers, the pools facility is static. That is, the pool configurations must be defined in advance. However, SOLARIS zones are dynamic. There can be many zones defined; the zones may not all be running at a particular time. Zones can be rebooted or even moved to a new host.

In the SOLARIS Containers approach to virtualization, zones and resource pools provide application containment. Within an application container, the application believes that it is running on its own server; however, the kernel and a number of system libraries are shared between the various containers. As well, the physical resources are shared in accordance with the configured resource pools.

FIGS. 1-3 illustrate an existing implementation of SOLARIS Containers, showing how virtualization allows multiple applications and servers to be consolidated onto a single physical server using application containers composed of zones and resource pools. As shown in FIG. 1, a single physical server 10, using server virtualization, allows the consolidation of an email application 12, a first web server 14, and a second web server 16. The single physical server 10 includes multiple virtual servers such that, after consolidation, each of the email application, first web server, and second web server exists on its own virtual server on server 10.

As best shown in FIG. 2, in order to create the application containers, each application has its own zone 22, 24, and 26. FIG. 3 illustrates the completed example including first and second resource pools 30 and 32, respectively. Zones 22, 24, and 26 are non-global zones; the global zone is indicated at 34. Global zone 34 is the original SOLARIS operating system instance.

With continuing reference to FIG. 3, zone 22 has a dedicated resource pool, pool 32. Zone 24, zone 26, and the global zone 34 share resource pool 30. The Fair Share Scheduler (FSS) proportionally allocates resources to zone 24, zone 26, and global zone 34 in accordance with assigned numbers of shares.

As shown, there are four application containers. The first container is composed of zone 22 and resource pool 32. The second container is composed of zone 24 and resource pool 30. The third container is composed of zone 26 and resource pool 30. The fourth container is composed of global zone 34 and resource pool 30.

Background information relating to SOLARIS Containers technology may be found in Joost Pronk van Hoogeveen and Paul Steeves, Solaris Software, "SOLARIS 10 How To Guides: Consolidating Servers and Applications with SOLARIS Containers," 2005, Sun Microsystems, Inc., Santa Clara, Calif.

Further background information may be found in "System Administration Guide: Solaris Containers-Resource Management and Solaris Zones," Part No.: 817-1592, 2006, Sun Microsystems, Inc., Santa Clara, Calif.

Another existing approach to virtualization involves what are referred to as virtual machines. In this approach to virtualization, software running on the host operating system (or in some cases below the host operating system) allows one or more guest operating systems to run on top of the same physical hardware at the same time. In this approach, the guest operating system is a full operating system, including the kernel and libraries.

Further, in an existing implementation of SOLARIS Containers, it is possible for one zone to either accidentally or deliberately consume most of the physical memory on the system, thereby negatively impacting the rest of the system. The existing resource capping daemon provided by the SOLARIS operating system does enable regulation of physical memory consumption by processes running in projects that have resource caps defined. However, in the case of zones, this is of limited utility because an instance of the resource capping daemon must run inside each zone. Running an instance of the resource capping daemon inside each zone is useful in some situations. There are also situations where this approach is ineffective such as, for example, when the zone administrator is untrusted. An untrusted zone administrator could circumvent the resource capping by changing the resource cap, violating the containment. In addition to the requirement that an instance of the resource capping daemon must run inside each zone, within a particular zone, all of the zone processes must run within a specified project in the zone with the specified project having a defined physical memory cap. This approach to physical memory capping, in addition to being insecure and easily circumvented, is complex and error prone to configure.

For the foregoing reasons, there is a need for an improved approach to physical memory capping for use in virtualization.

SUMMARY OF INVENTION

It is an object of the invention to provide an improved approach to physical memory capping for use in virtualization.

In accordance with the invention, a method of implementing virtualization on a physical server is provided. The physical server includes a plurality of physical resources and a virtualizing subsystem. The virtualizing subsystem is capable of creating separate environments on the physical server that logically isolate applications from each other. The separate environments share physical resources including physical memory.

The method comprises configuring a separate environment by defining properties of the separate environment. Configuring the separate environment includes specifying a physical memory cap. A global resource capping background service enforces physical memory caps. During operation of the separate environment, the global resource capping background service enforces the physical memory cap specified when the separate environment was configured.

The separate environment may be a virtual operating system. During operation of the virtual operating system, the global resource capping background service enforces the physical memory cap specified when the virtual operating system was configured. Alternatively, the separate environment may be a virtual machine. In the case of a virtual machine, the global resource capping background service enforces the physical memory cap specified when the virtual machine was configured. Further, it is to be appreciated that virtual operating systems and virtual machines are merely examples of virtualization implementations that may be configured with physical memory caps that are enforced by the global resource capping background service. For example, other sandbox type environments may run with physical memory caps that are enforced by the global resource capping background service when a sandbox starts or initializes.

Further, in a preferred implementation of the invention, workloads in the global environment may also be configured with specified physical memory caps. The global resource capping background service, in this implementation, enforces the physical memory caps specified for global environment workloads.

It is appreciated that the global resource capping background service may take many forms. For example, the global resource capping background service may be implemented as a daemon process in the global environment. Depending on the implementation, other forms for the global resource capping background service are possible, such as a kernel thread.

In addition to methods of physical memory capping for use in virtualization, the invention also comprehends a computer-readable storage medium having information stored thereon for directing a computer to perform a method of physical memory capping.

In an approach to implementing virtualization involving zones and resource pools such as SOLARIS Containers, the separate environments are zones that are configured and maintained by the zones subsystem. Configuring a zone may include specifying a physical memory cap for the zone. The SOLARIS resource capping daemon is enhanced so that it can limit each zone's memory consumption while the daemon is running in the global zone.

There are many advantages associated with embodiments of the invention. For example, separate environments may share physical resources including physical memory, and these separate environments may be configured with specified physical memory caps that are enforced by the resource capping background service. In the case of zones, a capped zone avoids the potential negative impact on the rest of the system that sometimes occurs with conventional, uncapped zones. The contemplated approach to physical memory capping allows separated environments such as zones and virtual machines to be configured with memory caps that are enforced by a single trusted process, running in the global zone. This overcomes some security issues associated with running a resource capping daemon in each zone, and simplifies configuration of the system.

DETAILED DESCRIPTION OF THE PREFERRED EMBODIMENT

The preferred embodiment of the invention enhances SOLARIS Containers in the SOLARIS operating system. In more detail, zones may be configured with specified physical memory caps that are enforced by a resource capping daemon process that runs in the global zone. In addition, the resource capping daemon enforces physical memory consumption caps on any projects running in the global zone. Of course, it is to be appreciated that enhancing SOLARIS Containers is one embodiment of the invention; a global resource capping background service that enforces physical memory caps on separate environments that logically isolate applications from each other, in accordance with the invention, may be implemented in other virtualization implementations such as implementations involving virtual machines or any other sandbox-like environments. Further, in the illustrated embodiment, the global resource capping background service is implemented as a daemon process; however, it is appreciated that other implementations are possible for this global service such as, for example, a kernel thread or other service implementation.

Figure 1:
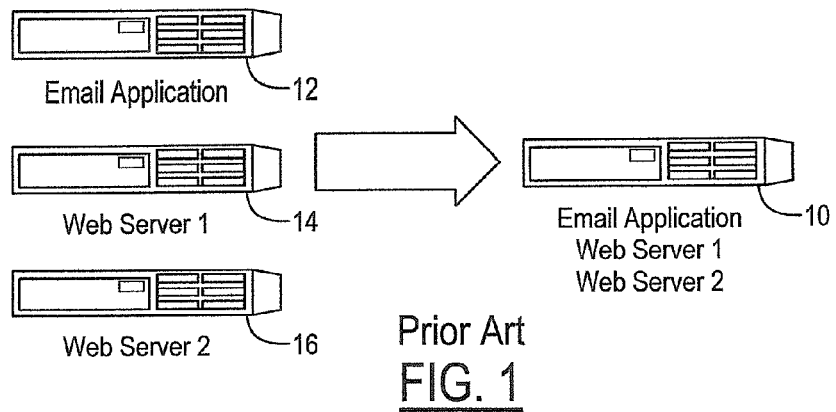
FIGS. 1-3 illustrate an example of server virtualization in an existing implementation of SOLARIS Containers.
Figure 2:
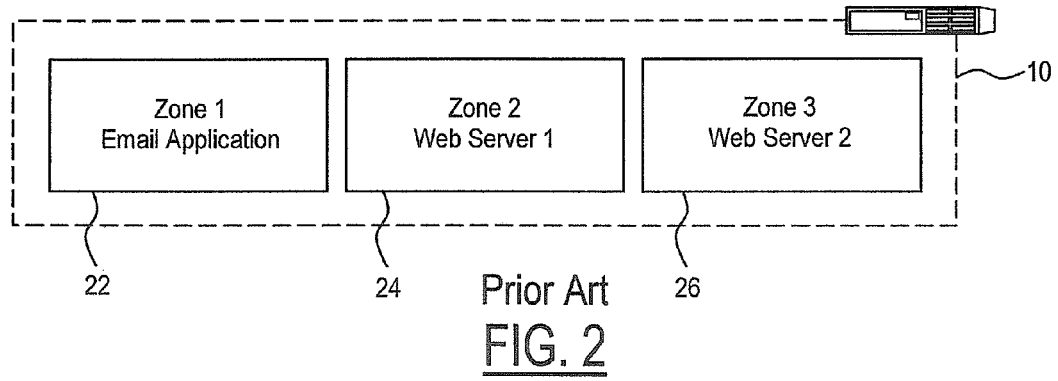
Figure 3:
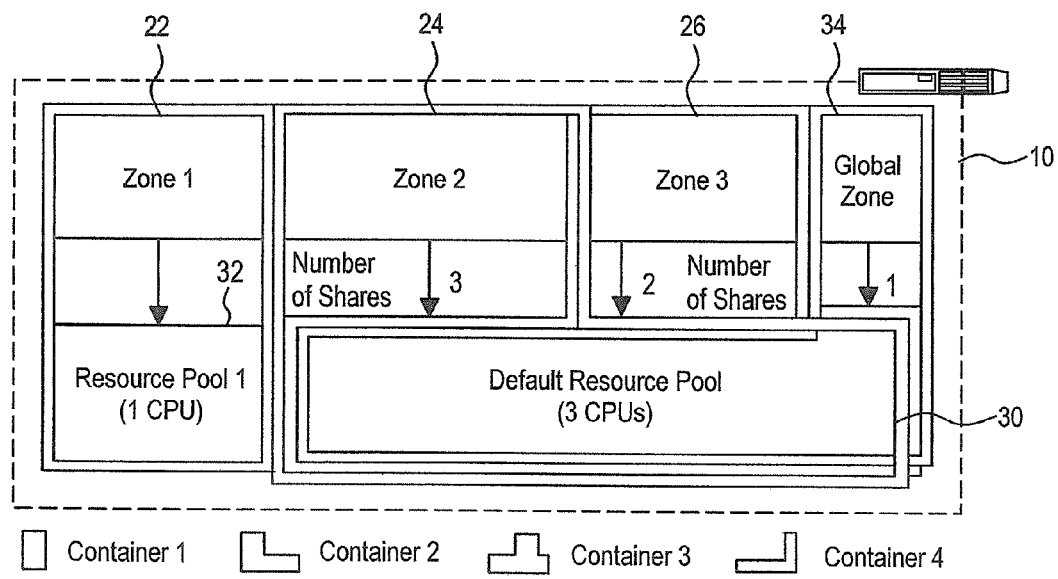
Figure 4:
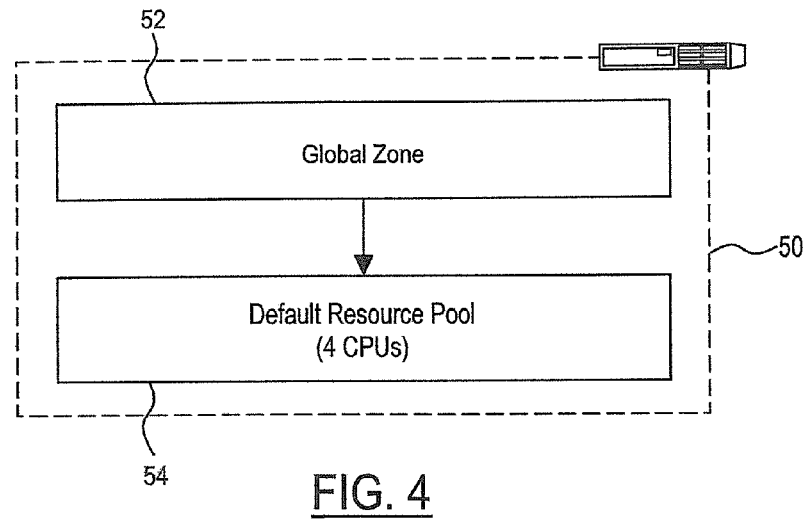
FIG. 4 illustrates a system, in the preferred embodiment of the invention, prior to any configuration.

FIGS. 4-10 illustrate a step-by-step example of server and application consolidation in the preferred embodiment of the invention, which is implemented as an enhancement to SOLARIS Containers in the SOLARIS operating system. FIG. 4 illustrates a system 50 prior to any configuration. System 50 initially has only the global zone 52 as non-global zones have not yet been configured. System 50 includes a single, default resource pool 54 consisting of four processors.

Figure 5:
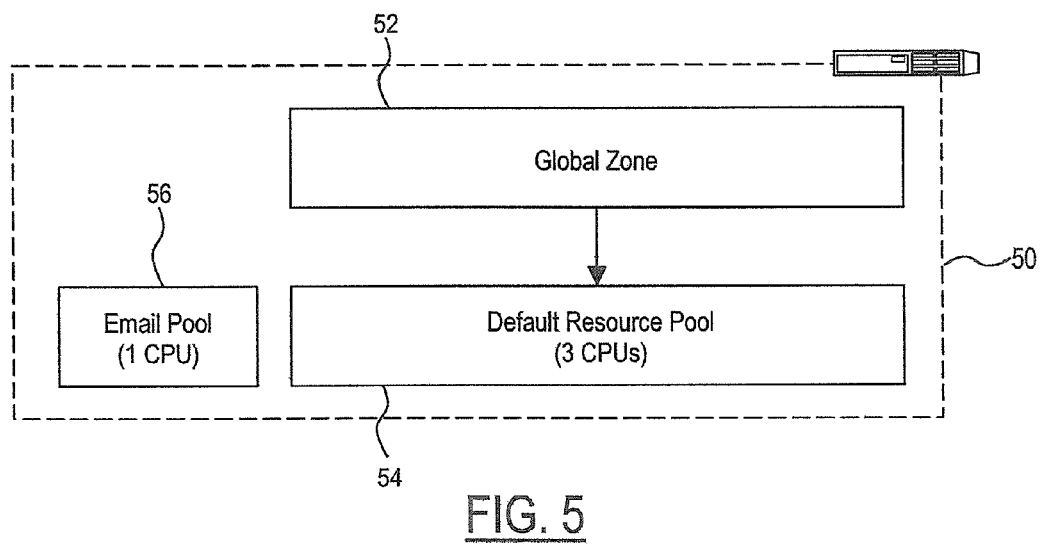
FIG. 5 illustrates the system after the creation of a resource pool for an email application.

FIG. 5 illustrates the system 50 with a resource pool 56 created with the SOLARIS pools facility. Resource pool 56 is composed of a single processor that has been removed from the default resource pool 54 and allocated to resource pool 56. Resource pool 56 is being created to provide dedicated resources for an email application. In more detail, a resource pool is a logical entity that owns a subset of the system resources. These subsets are known as resource sets. In this example, the resource set is a processor set. In order to create resource pool 56, a processor set is defined, in this case, as including a single processor. Resource pool 56 is then created and the processor set including the single processor is added to resource pool 56, resulting in the configuration shown in FIG. 5. This process for creating a resource pool may take place in a known fashion as provided by the pools facility in the SOLARIS operating system, as understood by one of ordinary skill in the art.

Figure 6:
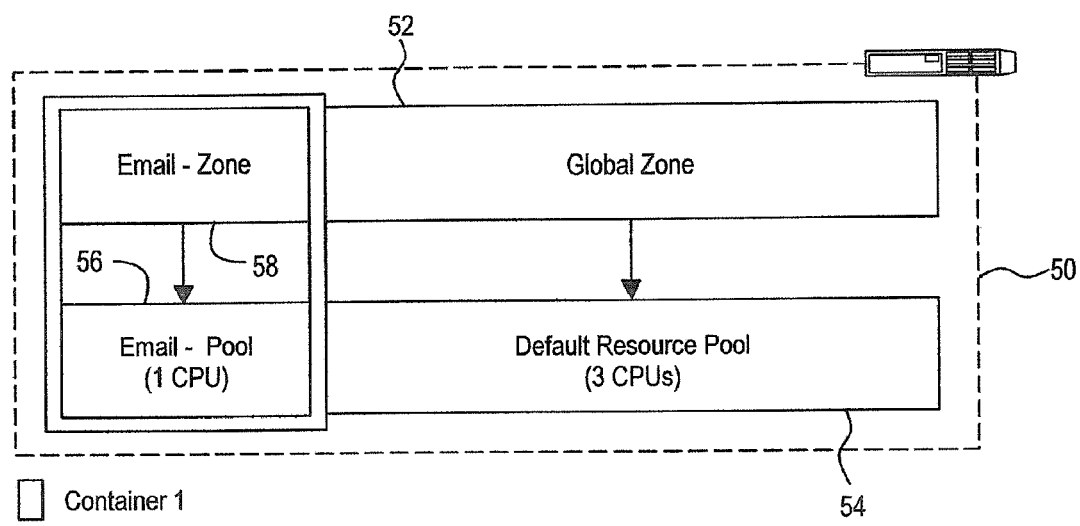
FIG. 6 illustrates the system after the configuration, installation, and booting of a zone for the email application.

FIG. 6 illustrates the system 50 after the next step, with a zone 58 for the email application having been configured, installed, and booted. The zone 58 and the resource pool 56 for the email application compose a container for the email application. In more detail, the zone 58 is a separate environment on the system 50 that logically isolates the email application from other applications outside of zone 58. Configuring a zone involves defining zone properties such as file systems and network interfaces, and involves designating a resource pool for the zone. In this case, the new zone 58 is assigned to resource pool 56. After the zone has been configured, installed, and is up and running, the result is the system 50 as shown in FIG. 6. The remaining three processors remain in the default resource pool 54 with the global zone 52. This process for creating a zone may take place in a known fashion as provided by the zones facility in the SOLARIS operating system, as understood by one of ordinary skill in the art.

Figure 7:
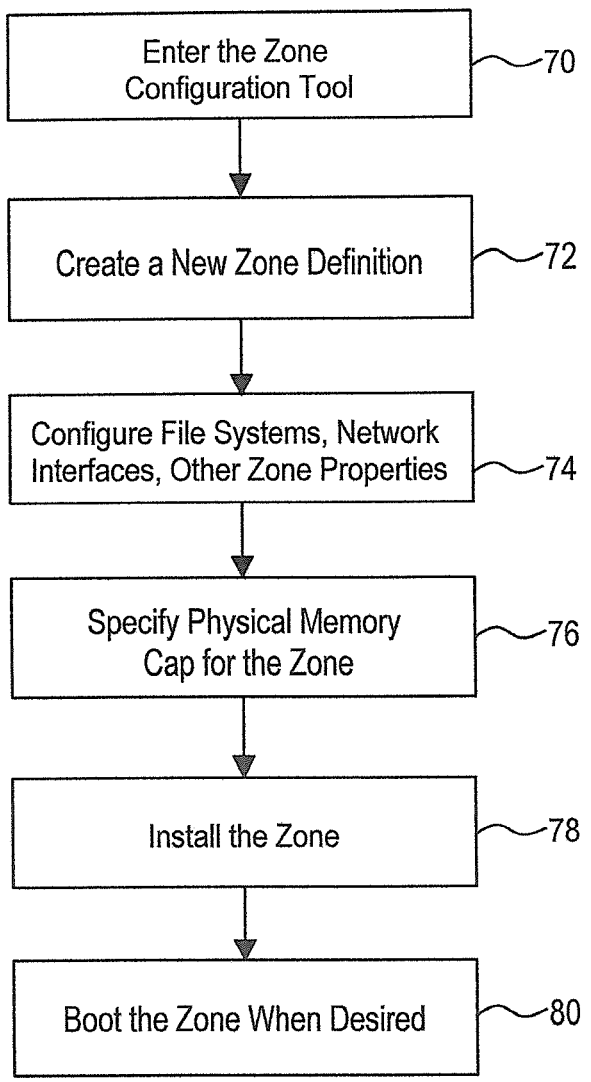
FIG. 7 illustrates the configuration and installation of a zone wherein, in accordance with the preferred embodiment of the invention, a physical memory cap is specified during configuration of the zone.

In accordance with the preferred embodiment of the invention, FIG. 7 illustrates the configuration and installation of a zone wherein a physical memory cap is specified during configuration of the zone. In order to configure a new zone, the zone configuration tool is entered at block 70. A new zone definition is created at block 72. The new zone is assigned to a file system, and network parameters are configured, at block 74. Other zone properties may also be configured at block 74. In accordance with the invention, configuring the new zone further includes specifying a physical memory cap for the new zone, as indicated at block 76. By specifying the physical memory cap during configuration of the new zone, some basic resource management configuration is integrated with the zone configuration.

The specified physical memory cap for the zone provides soft partitioning wherein physical memory is shared among zones, but wherein use of physical memory for a zone having a specified physical memory cap is capped. Physical memory consumption caps for zones are enforced by the resource capping daemon which is running in the global zone. In an exemplary implementation, the specified physical memory cap for a zone takes the form of a positive decimal number with a required k, m, g, or t modifier. For example, a value of '10 m' means 10 megabytes is the physical memory cap. A physical memory cap value for a zone is used by the resource capping daemon as the maximum resident set size for the zone. In more detail, the soft partitioning allows the sharing of memory among zones. For example, if you have a set of zones with each zone only using a portion of its specified physical memory cap, the system can be over-provisioned. This works because a well-behaved zone should not be bumping up against its cap, and the unused physical memory is available for other zones.

The new zone may be assigned to a dedicated resource pool to, for example, provide a dedicated number of processors. The new zone could also simply use the default resource pool. In general, embodiments of the invention relate to physical memory capping, and other resources for the zone may be managed in any suitable way as understood by one of ordinary skill in the art. Once the zone configuration is completed, the new zone is installed, as indicated at block 78. As indicated at block 80, the installed zone may be booted when desired.

Figure 8:
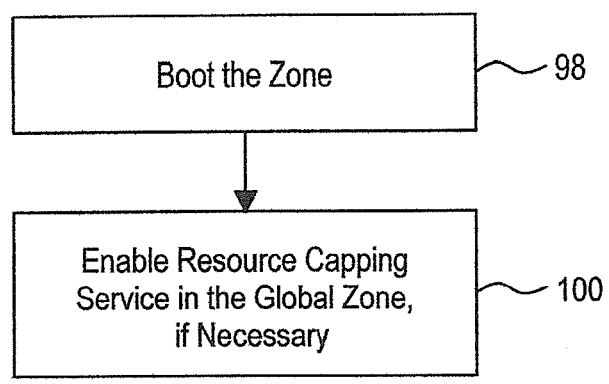
FIG. 8 illustrates the use of a physical memory cap for a zone in accordance with the preferred embodiment of the invention.

FIG. 8 illustrates the use of a physical memory cap for a zone in accordance with the preferred embodiment of the invention. At block 98, the zone is booted. In accordance with the invention, the physical memory cap for the zone is enforced by the resource capping daemon running in the global zone. The resource capping daemon also enforces physical memory caps on workloads (for example, SOLARIS projects) in the global zone. If the resource capping service is not already enabled when a zone with a specified physical memory cap boots, the resource capping service in the global zone is enabled as indicated at block 100.

In the preferred embodiment of the invention, the SOLARIS resource capping daemon is enhanced so that it can limit each zone's memory consumption while the daemon is running in the global zone. In addition, associated administrative and reporting utilities are also enhanced to support zone physical memory capping. In more detail, the kernel has traditionally maintained in-kernel data structures pertaining to projects, working set sizes, and resident set sizes to allow the resource capping daemon to sample resource utilization of projects that have physical memory caps, and to take actions when needed to reduce resource consumption of projects with memory caps to levels at or below the caps. In the preferred embodiment of the invention, data structures are maintained pertaining to zones, and to zone working set sizes and resident set sizes to allow a global instance of the resource capping daemon to sample resource utilization of zones that have physical memory caps, and to allow the global resource capping daemon to take actions when needed to reduce resource consumption of zones with memory caps to levels at or below the caps. Enhancements to the administrative and reporting utilities may include the ability to refresh in-kernel maximum resident set size settings for running zones, and the ability to provide status reports for zones in addition to status reports for projects in the global zone.

In more detail, in the preferred embodiment, the system must be able to calculate how much physical memory is being used by each capped zone. More specifically, the system counts how much physical memory all of the processes within a capped zone are using. When adding up the memory, the system keeps track of memory that it has already counted so that shared memory between processes is not counted more than once. Processes on the system must keep executing during the counting which implies that their physical memory needs can change dynamically. Also, processes may come and go during the counting. The implementation, in the preferred embodiment, should properly handle these various situations.

With regard to cap enforcement, in the preferred embodiment, once the system calculates how much memory is being used by each capped zone, the system enforces the physical memory caps as needed. Cap enforcement may be performed in several different ways. One way is to start paging out little used pages from processes in the zone where the cap is being enforced so that the physical memory consumption for the zone goes below the physical memory cap for the zone. This implies that nothing is done until the zone first exceeds its cap, and this type of cap enforcement provides a soft cap because the zone can be above its cap for a little while until the resource capping daemon catches up. Another approach would be to implement a hard cap where the zone cannot use more physical memory than it is capped at. Since there is a complex interaction with virtual memory, this implies that other parts of the virtual memory system would have to come into play to reclaim some physical memory so that the process needing more physical memory could proceed. A hard cap approach, if desired, should be implemented in the kernel so that is is fast, inexpensive and properly enforced at all times.

Figure 9:
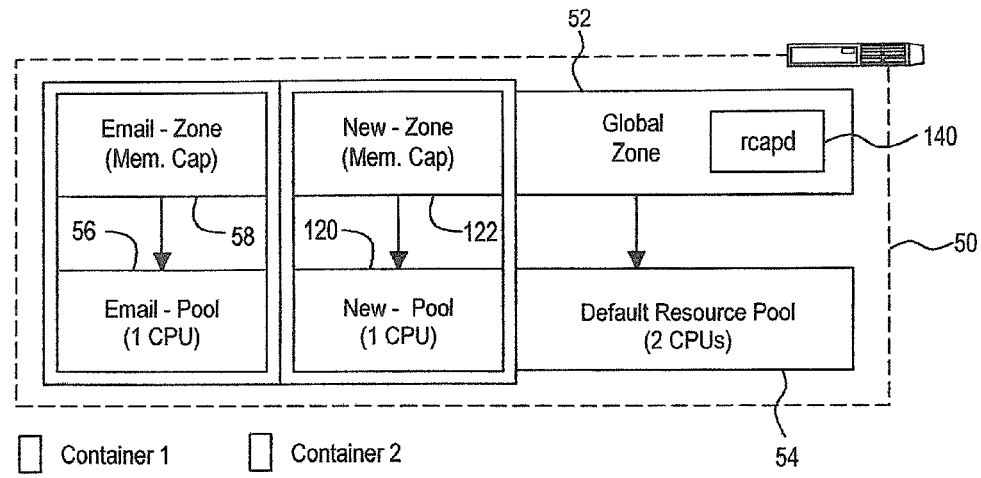
FIG. 9 illustrates the system after configuration, installation, and booting of a new zone that use a physical memory cap, and after the addition of a physical memory cap to the email application's zone.

FIG. 9 illustrates the system 50 with zone 58 for the email application having been configured and installed, and assigned to resource pool 56 as illustrated in FIG. 6; however, FIG. 9 further illustrates a new zone 122 having been configured, installed and booted wherein the new zone 122 uses a new resource pool 120. Zone 122 is configured and installed according to the method shown in FIG. 7, and the configuration for zone 122 specifies a physical memory cap. In FIG. 9, zone 58 for the email application has also been configured with a physical memory cap. The resource capping daemon 140 runs in the global zone 52 and enforces the physical memory caps on zones 58 and 122. More specifically, the kernel maintains data structures pertaining to zones 58 and 122, and to zone working set sizes and resident set sizes for zones 58 and 122. The resource capping daemon 140, running in global zone 52, samples resource utilization of zones 58 and 122, and takes actions when needed to reduce resource consumption of zones 58 and 122. The particular actions taken to reduce the resident set size for a zone may take many forms, and embodiments of the invention may use any suitable techniques to reduce resident set size, for example, by moving more data from physical memory to virtual memory, as understood by one of ordinary skill in the art.

Figure 10:
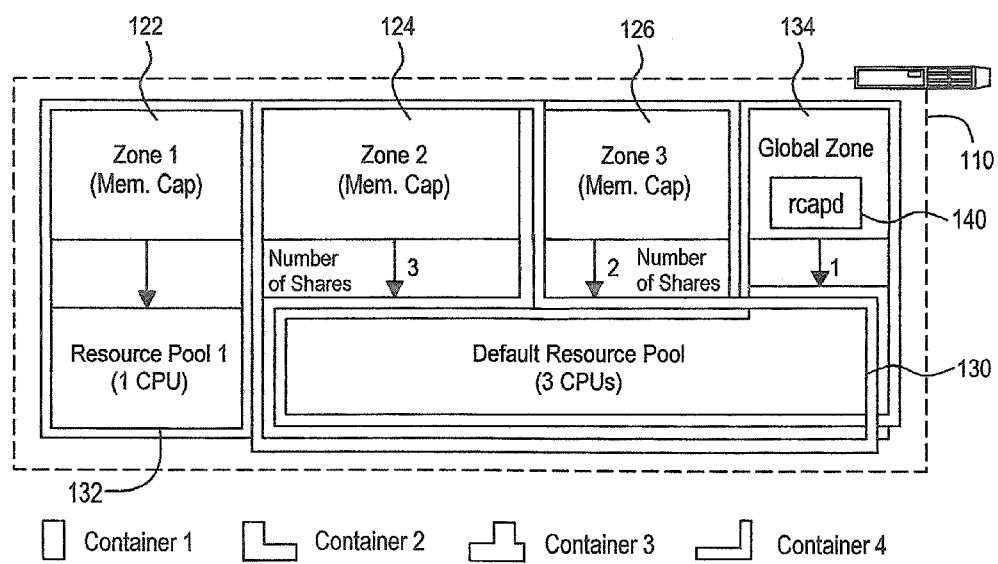
FIG. 10 illustrates an example of server virtualization using zones, with each zone being configured with a physical memory cap, in accordance with the preferred embodiment of the invention.

FIG. 10 illustrates an example of server virtualization using zones, with each zone being configured with a physical memory cap, in accordance with the preferred embodiment of the invention. In FIG. 10, the server is indicated at 110. Zone 122 has a dedicated resource pool, pool 132. Zone 124, zone 126, and the global zone 134 share resource pool 130. The Fair Share Scheduler (FSS) proportionally allocates resources to zone 124, zone 126, and global zone 134 in accordance with assigned numbers of shares.

As shown, there are four application containers. The first container is composed of zone 122 and resource pool 132. The second container is composed of zone 124 and resource pool 130. The third container is composed of zone 126 and resource pool 130. The fourth container is composed of global zone 134 and resource pool 130.

Each zone 122, 124, and 126 is configured and installed according to the method shown in FIG. 7, and the configuration for each zone 122, 124, and 126 specifies a physical memory cap. The resource capping daemon 140 runs in the global zone 134 and enforces the physical memory caps. More specifically, the resource capping daemon 140 samples resource utilization of each zone 122, 124, and 126, and takes actions when needed to reduce physical memory consumption.

It is appreciated that the above-described preferred embodiment of the invention enhances SOLARIS Containers in the SOLARIS operating system. The invention is also applicable to other virtualization implementations wherein a physical server (physical server includes traditional server computers, workstations, desktop computers, and any other computing platforms having a plurality of physical resources that are used to provide services) includes physical resources, and wherein there is a virtualizing subsystem. Further, the separate environments that logically isolate applications from each other, zones in the preferred embodiment, may take other forms and may implement other sandbox-like environments such as virtual machines and are not limited to virtual operating systems. Put another way, embodiments of the invention may be employed in a variety of platforms to perform physical memory capping.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for virtualizing a physical server that includes a plurality of physical resources, a kernel, a plurality of libraries, and a virtualizing subsystem, the method comprising:

defining properties of and specifying a physical memory cap for each of a plurality of environments such that each of the environments logically isolates an application thereon from applications of other of the environments, provides the application with a dedicated namespace, and shares the physical resources including physical memory, the kernel, and the plurality of libraries; and implementing a global resource capping background service configured to run on a global environment different than the environments and enforce each of the physical memory caps for the respective environments without cooperation of the environments.

2. The method of claim 1, wherein each of the environments is a virtual operating system, further comprising starting operation of the environments by booting the virtual operating systems.

3. The method of claim 1 further comprising starting at least one global environment workload including a configuration specifying a physical memory cap for the at least one global environment workload, wherein the global resource capping background service is further configured to enforce the physical memory cap for the at least one global environment workload while enforcing each of the physical memory caps for the respective environments.

4. The method of claim 1, wherein the global resource capping background service is implemented as a global environment daemon process.

5. A computer-readable storage medium having information stored thereon for directing a computer to perform the method of claim 1.

6. A method for virtualizing a physical server that includes a plurality of physical resources, a kernel, a plurality of libraries, and a virtualizing subsystem, the method comprising:

defining properties of and specifying a physical memory cap for each of a plurality of environments such that each of the environments defines a zone that logically isolates an application thereon from applications of other of the zones, provides the application with a dedicated namespace, and shares the physical resources including the physical memory, the kernel, and the plurality of libraries; and implementing a global resource capping background service configured to run on a global zone different than the zones and enforce each of the physical memory caps for the respective zones without cooperation of the zones.

7. The method of claim 6, wherein each of the zones is a virtual operating system, further comprising starting operation of the virtual operating systems by booting the virtual operating systems.

8. The method of claim 6 further comprising starting at least one global environment workload including a configuration specifying a physical memory cap for the at least one global environment workload, wherein the global resource capping background service is further configured to enforce the physical memory cap for the at least one global environment workload while enforcing each of the physical memory caps for the respective zones.

9. The method of claim 6, wherein the global resource capping background service is implemented as a global environment daemon process.

10. A computer-readable storage medium having information stored thereon for directing a computer to perform the method of claim 6.

11. A method for virtualizing a physical server including a plurality of physical resources and a global environment, the global environment having an operating system including a kernel, a plurality of libraries, and a virtualizing subsystem, the method comprising:

defining properties of and specifying a physical memory cap for each of a plurality of environments such that each of the environments defines a zone that logically isolates an application thereon from applications of other of the zones, provides the application with a dedicated namespace, and is a virtual operating system that shares the plurality of physical resources including physical memory, the kernel, and the plurality of libraries;

starting at least one global environment workload including a configuration specifying a global physical memory cap; and implementing a global resource capping background service configured to enforce the global physical memory cap and each of the physical memory caps without cooperation of the zones.

12. The method of claim 11 further comprising starting operation of the virtual operating systems by booting the virtual operating systems.

13. A computer-readable storage medium having information stored thereon for directing a computer to perform the method of claim 11.

* * * * *

UNITED STATES PATENT AND TRADEMARK OFFICE
CERTIFICATE OF CORRECTION

| | | |
|---|---|---|
| PATENT NO. | : 8,954,686 B2 | |
| APPLICATION NO. | : 11/765133 | |
| DATED | : February 10, 2015 | |
| INVENTOR(S) | : Jelinek et al. | |

It is certified that error appears in the above-identified patent and that said Letters Patent is hereby corrected as shown below:

In the specification,
In column 8, line 17, delete "is is" and insert -- is --, therefor.

Signed and Sealed this
Twenty-second Day of March, 2016

Michelle K. Lee
*Director of the United States Patent and Trademark Office*